United States Patent

Goldberg et al.

[11] Patent Number: 5,748,890
[45] Date of Patent: May 5, 1998

[54] METHOD AND SYSTEM FOR AUTHENTICATING AND AUDITING ACCESS BY A USER TO NON-NATIVELY SECURED APPLICATIONS

[75] Inventors: Max Motti Goldberg; Melodi Mosley Gates, both of Denver; Susan Barbara Ericksen, Englewood; William O. White, Boulder, all of Colo.

[73] Assignee: U S West, Inc., Englewood, Colo.

[21] Appl. No.: 772,675

[22] Filed: Dec. 23, 1996

[51] Int. Cl.⁶ .............................. G06F 12/14; H04L 9/32
[52] U.S. Cl. ........................... 395/188.01; 395/186
[58] Field of Search ................................. 395/186, 187, 395/490, 674, 676, 188.01; 380/25, 24, 30; 340/825.31, 825.3, 825.34

[56] References Cited

U.S. PATENT DOCUMENTS

| | | | |
|---|---|---|---|
| 4,218,738 | 8/1980 | Matyas et al. | 380/25 |
| 4,694,492 | 9/1987 | Wirstrom et al. | 380/23 |
| 5,113,442 | 5/1992 | Moir | 380/25 |
| 5,261,102 | 11/1993 | Hoffman | 395/186 |
| 5,305,456 | 4/1994 | Boitana | 395/196 |
| 5,361,359 | 11/1994 | Tajalli et al. | 395/186 |
| 5,414,844 | 5/1995 | Wang | 395/186 |
| 5,421,011 | 5/1995 | Camillone et al. | 395/674 |
| 5,469,576 | 11/1995 | Dauerer et al. | 395/186 |
| 5,604,490 | 2/1997 | Blakley, III et al. | 340/825.31 |
| 5,664,098 | 9/1997 | Bianchi et al. | 395/186 |
| 5,671,354 | 9/1997 | Ito et al. | 395/187.01 |

*Primary Examiner*—Robert W. Beausoliel, Jr.
*Assistant Examiner*—Ly V. Hua
*Attorney, Agent, or Firm*—Brooks & Kushman

[57] ABSTRACT

A method for authenticating access by a user to non-natively secured applications intended for use in cooperation with an operating system having a native security system. A profile is assigned to the user which defines the user's access rights to the non-natively secured applications. At least one datastore is provided in communication with the operating system for storing the user's profile relating to each of the non-natively secured applications, including an access control list defining authorized users and a set of pooled accounts authenticated for access to the respective non-natively secured application. The user's profile is compared with the access control list for the selected non-natively secured application to determine if a user is valid for the request. If the user is valid for the request, an available account is assigned to the user as the user's virtual identity, account data is forwarded to a launcher application, and a audit record is written to map the user to the assigned account and thus the non-natively secured application.

20 Claims, 6 Drawing Sheets

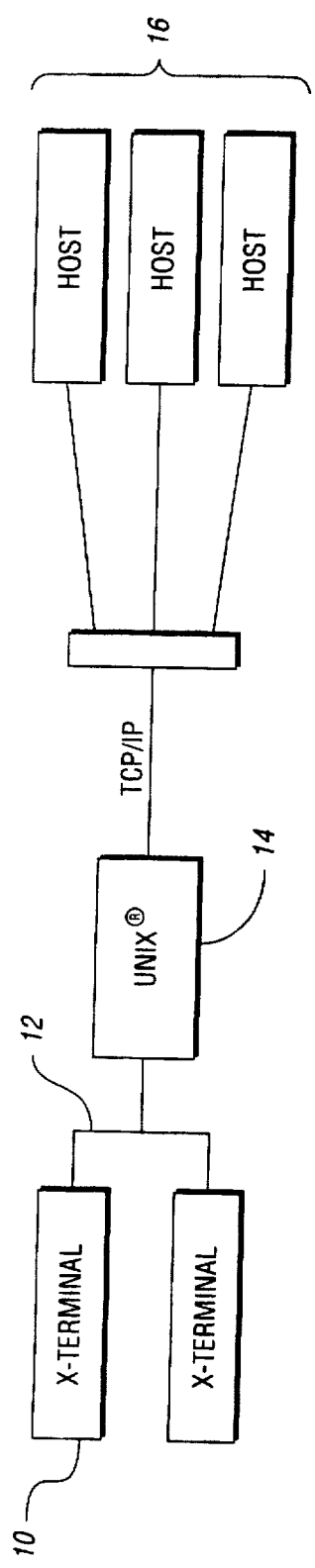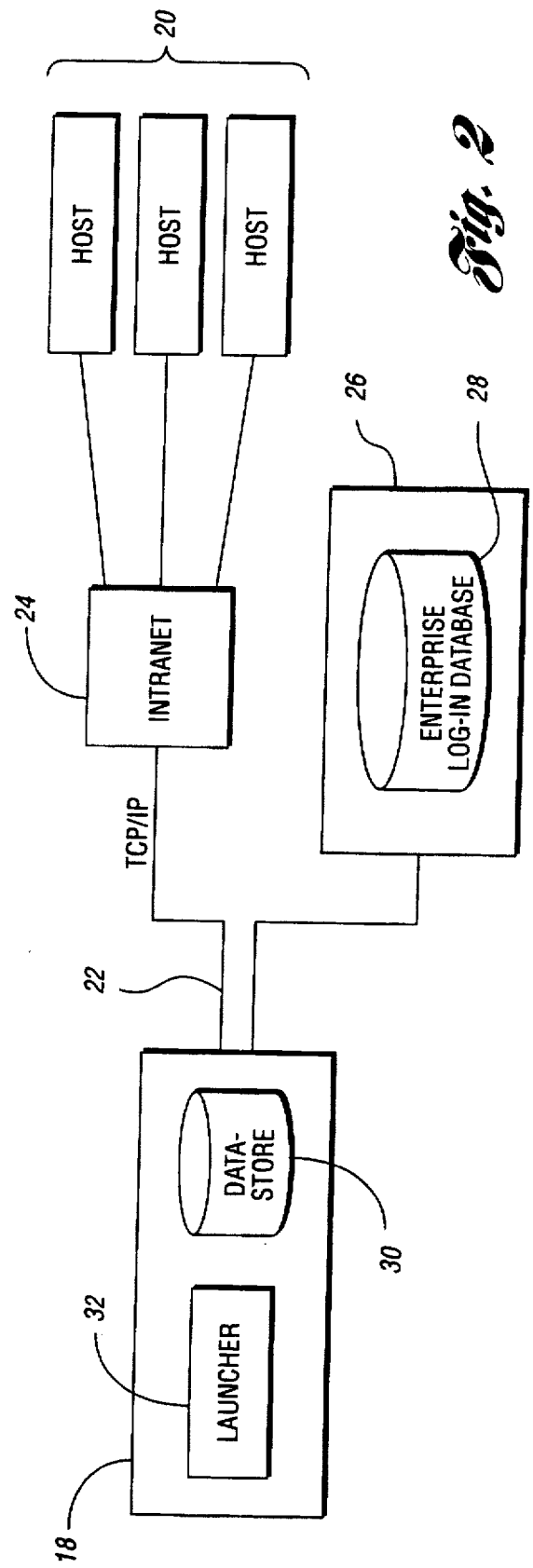

5,748,890

METHOD AND SYSTEM FOR AUTHENTICATING AND AUDITING ACCESS BY A USER TO NON-NATIVELY SECURED APPLICATIONS

TECHNICAL FIELD

This invention relates to a method and system for authenticating and auditing access by a user to non-natively secured applications in cooperation with a computer operating system having a native security system.

BACKGROUND ART

Customer contact employees, particularly those who work in large service center environments, are required to access many diverse sets of host applications on a regular basis via their computer terminals. This access may be direct via an active terminal emulation session, or indirect via an intermediary application which uses the host application as a service as opposed to an active session. Applicant's average mass market service representatives (those dealing with residential telephone subscribers), for example, may be required to access more than 50 different host applications a day. High end complex services representatives may be required to access more than 200 such applications.

Each of these applications provides its own, often unique, user authentication scheme and is thus termed non-natively secured. To date, management of these many authentication schemes has proven expensive, time consuming and ineffective from an accountability standpoint.

Consider, for example, a conventional network such as that shown in FIG. 1, wherein each user or service representative is provided an "x-terminal" 10 which is connected via a local network 12 to one or more large-scale Unix® presentation servers 14. The Unix® servers 14, are in turn, connected via a Transmission Control Protocol/Internet Protocol (TCP/IP) transmission path or other suitable connection to one or more non-natively secured host applications 16. In a user identity based authentication scheme, each of these non-natively secured applications 16 is mapped to a specific user. Each user therefore has a unique password or access code for each non-natively secured application. If a user therefore requires access to 50 applications, she needs 50 uniquely maintained passwords.

As those skilled in the art will recognize, this prior art authentication scheme is extremely time consuming. In practice, service representatives literally had notebooks on their shelves filled with lists of host applications and corresponding passwords. Moreover, this authentication scheme was not secure and did not provide true end-to-end accountability, in that it inherently permitted situations wherein service representatives could use the passwords of others. This approach also provided limited flexibility in that certain host applications, by virtue of their design or functionality, have a limited number of accounts.

In an effort to overcome the difficulties caused by user identity based accounts, system designers developed "functional accounts" which constitute a set of accounts on a host system or application having comparable privileges. For example, a group of 20 users such as technical consultants may be assigned a functional account which permits each of the user's concurrent access to the same host application using the same password. Rather than having a hundred different accounts for 100 different users, the application may now have, for example, five different accounts with each account being assigned to a group of 20 users operating as a functional identity.

While functional accounts may have been seen as an advance by the user community because it permitted more users access to certain host applications that previously could not be accessed because of inherent limitations, such accounts were not seen as an advance from a systems management and operations organization standpoint. In fact, functional accounts were seen as a near complete breakdown in system security in that all end-to-end accountability was lost because of the operation of each group as a functional identity. Since all members of the group were permitted access at the same time and with the same password or access code, it was impossible to determine what actions were taken by which user of the group.

Consequently, a need exists for a method and system for authenticating and auditing access by a user to non-natively secured applications which overcomes the above-noted difficulties. Namely, the system and method must be easy and inexpensive to use but without sacrificing system security.

SUMMARY OF THE INVENTION

It is an object of the present invention to provide a method and system for authenticating and auditing access by a user to non-natively secured applications.

It is a further object of the present invention to provide a method and system for authenticating and auditing access by a user to non-natively secured applications through the use of a single password.

It is a further object of the present invention to provide a method and system for authenticating and auditing user access to non-natively secured applications which does not require the user to go off line and request a password reset when a host account becomes damaged.

Still further, it is an object of the present invention to provide a method and system for authenticating and auditing user access to non-natively secured applications which is based upon the user's role, or job function and not defined on personal terms, such that users are provided access to the least amount of data required to complete their job functions.

It is also a further object of the present invention to provide a method and system for providing user access to non-natively secured applications wherein the notions of user authentication and user auditing are addressed as separate concerns.

Still further, it is an object of the present invention to provide a method and system for permitting user access to non-natively secured applications which leverages the functionality of existing native security systems.

In carrying out the above objects, a method is provided for authenticating and auditing access by a user to non-natively secured applications. The method is specifically directed for use in cooperation with an operating system having a native security system. The method includes assigning a profile to the user to define the user's access rights to the non-natively secured applications. The user profile includes the user's identity and may also include a set of assigned roles.

The method further includes providing at least one datastore in communication with the operating system for storing the user profile as well as account data relating to each of the non-natively secured applications, including an access control list defining authorized identities and/or roles and a set of pooled accounts authenticated for access to the respective non-natively secured application. The pool will generally include a plurality of entries. In some situations, however, where a non-natively secured application demands a one-to-one correspondence with individual user identities, the pool will comprise a single entry.

The access control list may include authorized user roles and/or authorized user identities. In a preferred embodiment, the user profile and the access control list for each non-natively secured application is stored in a first datastore and the set of pooled accounts is stored in a second datastore such as a database termed an Enterprise Log-In Database (ELDB) which is run by a server.

In operation, a launcher application generates a call to the native security system or an extension thereof in response to a request by a user to access a selected non-natively secured application. Thereafter, it is determined if the user is permitted access to the selected non-natively secured application. This determination may be made by comparing the user's assigned roles with the authorized roles for the selected non-natively secured application to determine if at least one assigned role is valid for the request. Alternatively, or in addition thereto, this determination may be made by comparing the user's identity with the authorized identities for the selected non-natively secured application to determine if the user is valid for the request.

If it is determined that the user is permitted access to the selected non-natively secured application, an account is requested from the set of pooled accounts. Thereafter, it is determined if an account is available from the set of pooled accounts. If it is determined that an account from the pool is available, the account will be assigned to the user as the user's virtual identity to the selected non-natively secured application. Thereafter, account data will be forwarded to the launcher application and an audit record will be generated to map the user to the assigned account and thus the requested non-natively secured application.

In carrying out the above method, a system is also provided for authenticating and auditing access by a user to non-natively secured applications. Again, the system is specifically directed for use in cooperation with an operating system having a native security system. The system comprises at least one datastore which is provided in communication with the operating system. The datastore includes:

(a) a profile assigned to the user to define the user's access rights to the non-natively secured applications, (b) account data relating to each of the non-natively secured applications, including an access control list defining authorized users, and (c) a set of pooled accounts authenticated for access to the respective non-natively secured application.

As in the above described method, the user profile includes the user's identity and may also include a set of assigned roles. Similarly, the access control list may include a set of authorized user roles and/or a set of authorized user identities. Again, in a preferred embodiment, the user profile and the access control list for each non-natively secured application is stored in a first datastore. The set of pooled accounts is preferably, but not necessarily, stored in a second datastore such as a database termed an Enterprise Log-In Database (ELDB) which is run by a server.

Again, as discussed above, the access determination may be made at the native security system or an extension thereof by comparing the user's assigned roles with the authorized roles or the selected non-natively secured application to determine if at least one assigned role is valid for the request. Alternatively, or in addition thereto, the access determination may be made by comparing the user's identity with the authorized identities for the selected non-natively secured application to determine if the user is valid for the request.

The native security system or extension thereof of the above described system is further operative to:

(a) request an account from a set of pooled accounts in response to the determination that the user is permitted access to the selected non-natively secured applications;

(b) determine if an account is available from the set of pooled accounts;

(c) assign an account to the user in response to a determination that an account is available from the set of pooled accounts; and (d) generate an audit record to map the user to the assigned account.

As in the above described system, the assigned account functions as the user's virtual identity to the selected non-natively secured application.

These and other objects, features and advantages of the present invention will be more readily apparent when viewed in connection with the following drawings wherein like reference numerals correspond to like components.

BRIEF DESCRIPTION OF THE DRAWINGS

FIG. 1 is a schematic diagram of a conventional Unix®-based local network typically operable via a user identity-based or functional account based authentication scheme;

FIG. 2 is a schematic diagram of a representative PC-based network which may operate most efficiently in accordance with the present invention;

BEST MODES FOR CARRYING OUT THE INVENTION

Figure 3:
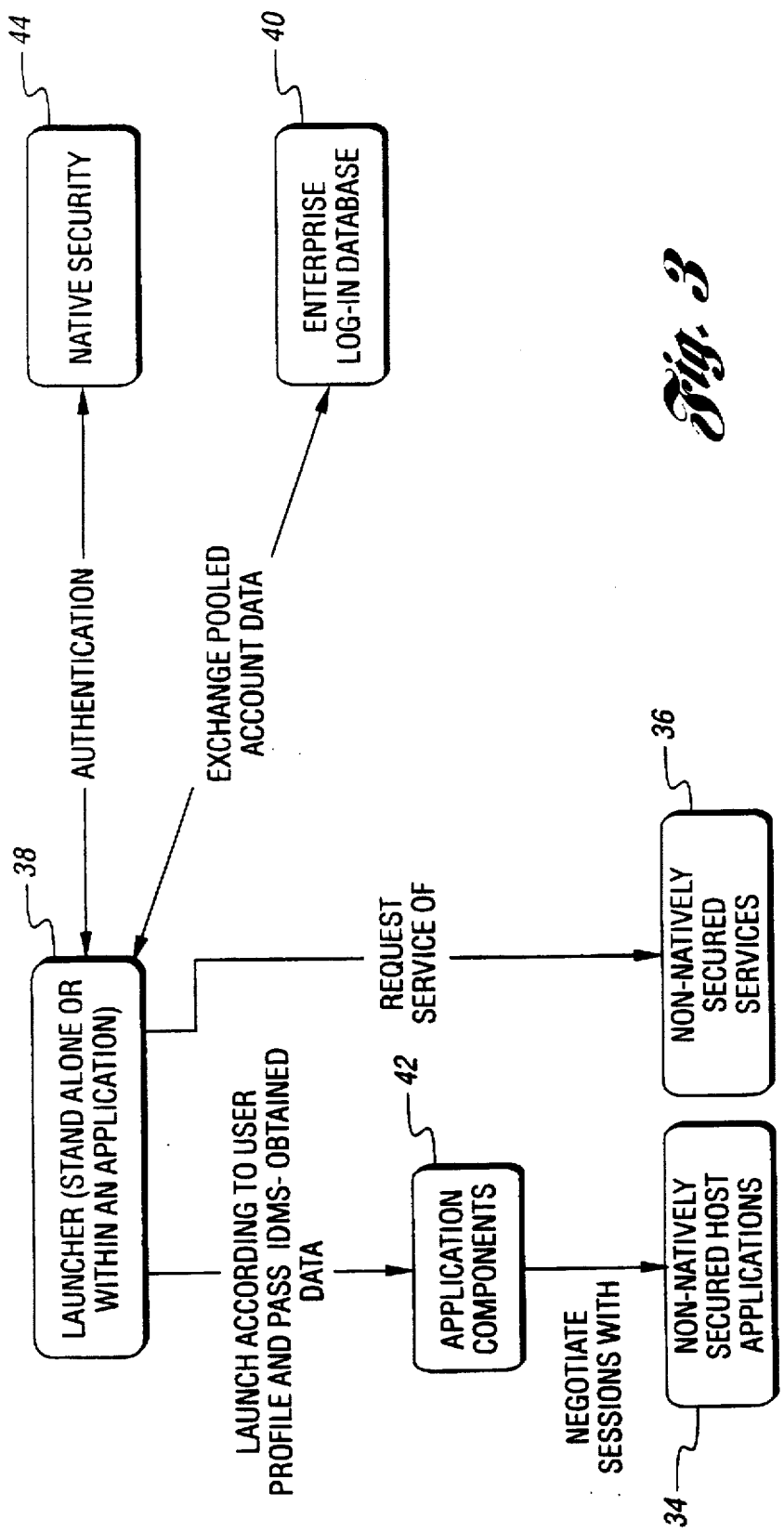
FIG. 3 is a schematic diagram illustrating common relationships between and among the components addressed by the present invention.

Referring to FIG. 2 of the drawings, there is shown a schematic diagram of a representative system which may operate most efficiently in accordance with the present invention. The system includes a high-end PC work station 18 having a robust operating system such as, for example, Microsoft Windows® NT 4.0 or any other suitable operating system which has the ability to (1) define users based on user identities, roles or groups; and (2) provide access control lists to objects in the system.

Workstation 18 is provided in communication with one or more non-natively secured host applications 20 via a suitable network connection. In the embodiment shown, a Transmission Control Protocol/Internet Protocol (TCP/IP) transmission path 22 is shown with each of the host applications 20 connected via a corporate intranet 24. Any suitable connection, however, is operative including local or wide area networks.

A server 26 is also provided in communication with workstation 18. Server 26 is operative to run an Enterprise Log-In Database (ELDB) 28 which, in it's simplest form, is a database operative to store a set of pooled accounts authenticated for access to the respective non-natively secured applications 20. The native security system of workstation 18 further includes a datastore 30 for storing a profile for each user to define the user's access rights to the non-natively secured applications 20. The native security system datastore further includes account data relating to each of the non-natively secured applications, including an access control list defining authorized users.

In keeping with the invention, the access control list comprises markers which identity who is permitted access to the non-natively secured applications and applies identities and/or roles to make this determination. Each user profile thus includes the user's identity and may also include a set of assigned roles. Similarly, each access control list may include a set of authorized user roles and/or a set of authorized user identities. In less robust systems, such as the Unix®-based systems discussed above as shown generally in FIG. 1, the functions of the native security system datastore may be performed by the ELDB 28.

Finally, workstation 18 also includes a launcher application 32 as will be discussed in further detail below.

Referring now to FIG. 3 of the drawings, there is shown a schematic diagram which depicts the most common relationships between and among the application types addressed by the present invention. As those skilled in the art will recognize, applications or application components are generally processing components which provide specific services, typically including a user interface, to the user. Applications also provide user access to non-natively secured applications either of the host type as designated by reference numeral 34 and discussed in further detail herein, or of a service type 36 on the native platform. The non-natively secured applications may be accessed explicitly via terminal emulation or implicitly through an Application Programming Interface (API) such as, for example, a graphical user interface. When an access path is created, the application component becomes a desktop extension of the non-natively secured application.

Launcher 38 is understood as the processing components provided on the user and administrative desktops to negotiate requests for access to application components. In keeping with the invention, this negotiation process includes handling the account requests/release protocol exchange with an ELDB database 40, the details of which are discussed further below. The launcher process is provided as a distinct component over (or besides) the applications or tools to secure access to the ELDB and is granted specific user rights by the native security system (preferably, but not necessarily Microsoft Windows® NT 4.0 or its equivalent) to prevent unauthorized access to applications or tools that in turn access hosts.

Host(s) as the term is used herein, are processing elements or applications that users access via application components 42. The term is used to refer to both the systems (machines) that provide such services as well as the applications that run on those systems. These systems typically have their own user authentication schemes and may be accessed through terminal emulation sessions (often called native sessions) since this is the type of access originally planned for and provided by most hosts or by Graphical User Interface (GUI) applications that separate the user presentation processing layer from host data access.

For purposes of the invention, a host application is considered to be of the non-natively secured application type. As those skilled in the art will recognize, non-natively secured applications may be either an external, host application as discussed above which are accessed via an emulator, or services that reside on the native platform but do not support service-to-service delegation. i.e., processes in which a processing element passes user credentials to another element on behalf of a user.

Two types of delegation are addressed as part of the present invention including server-to-server and service-to-service. Server-to-server delegation, also called impersonation by Windows® NT, takes place when a processing component on a given server (A) detects that the requested services are available on another server (B). The user's credentials are passed along by (A) with the request for services from (B). Service-to-service delegation passes a users credentials onto a requested service known through a directory (name look-up).

In non-natively secured applications, security is handled by the application or its environment, which does not interact with the native (desktop) security system. In accordance with the invention described herein, security negotiation for this type of application is provided on behalf of the user in the case of host type applications. In the case of a native platform service, native security is used to provide access either by granting privileges to the launcher or through the ELDB via a virtual identity, a case that requires coding on the part of the application using the service. For instance, if (A) is an application using a non-natively secured service (B), (A) can be granted access and can check for whether the user should be granted privileges for (B). Any coding changes are made to (A), not (B).

Native security systems, such as that designated by reference numeral 44 in FIG. 3, include mechanisms and policies for user authentication and resource protection on the hosts with accounts managed by a relational database, such as the Enterprise Log-In Database (ELDB) 40 of the invention. The database provides a storage mechanism for host account data and a means for accessing that data. In keeping with the invention, the logging of audit data is included as an ELDB. Programming interfaces are provided for allocating and de-allocating accounts, as requested by user applications and for administrative actions such as password/role and account maintenance and audit reporting.

In a preferred embodiment, every user is assigned a set of roles in addition to their identity. The set of roles includes a set of user job functions and their corresponding host requirements. In this embodiment, the security environment of the present invention is thus said to be role-based because rather than defining a set of access privileges for a user based on personal identity, the administrator grants specific privileges implicitly by defining roles for the user. Access rights to specific application components are thus mapped to roles.

When a user requests access to an application or service, the user is authenticated to the application using a role-based, virtual identity rather than a user identity, which results in a conceptual and operational separation between the notions of user identification and system auditing. The virtual identities are maintained in a pool by the ELDB. The pool will generally comprise a plurality of entries. In some situations, however, where a non-natively secured application demands a one-to-one correspondence with individual user identities, the pool will comprise a single entry. As part of the invention, automated and semi-automated administrative services for managing the pool of virtual identity accounts is provided, including pro-active, pre-expiration password changes, revoked/damaged account repair and host usage, metrics and auditing.

Figure 4:
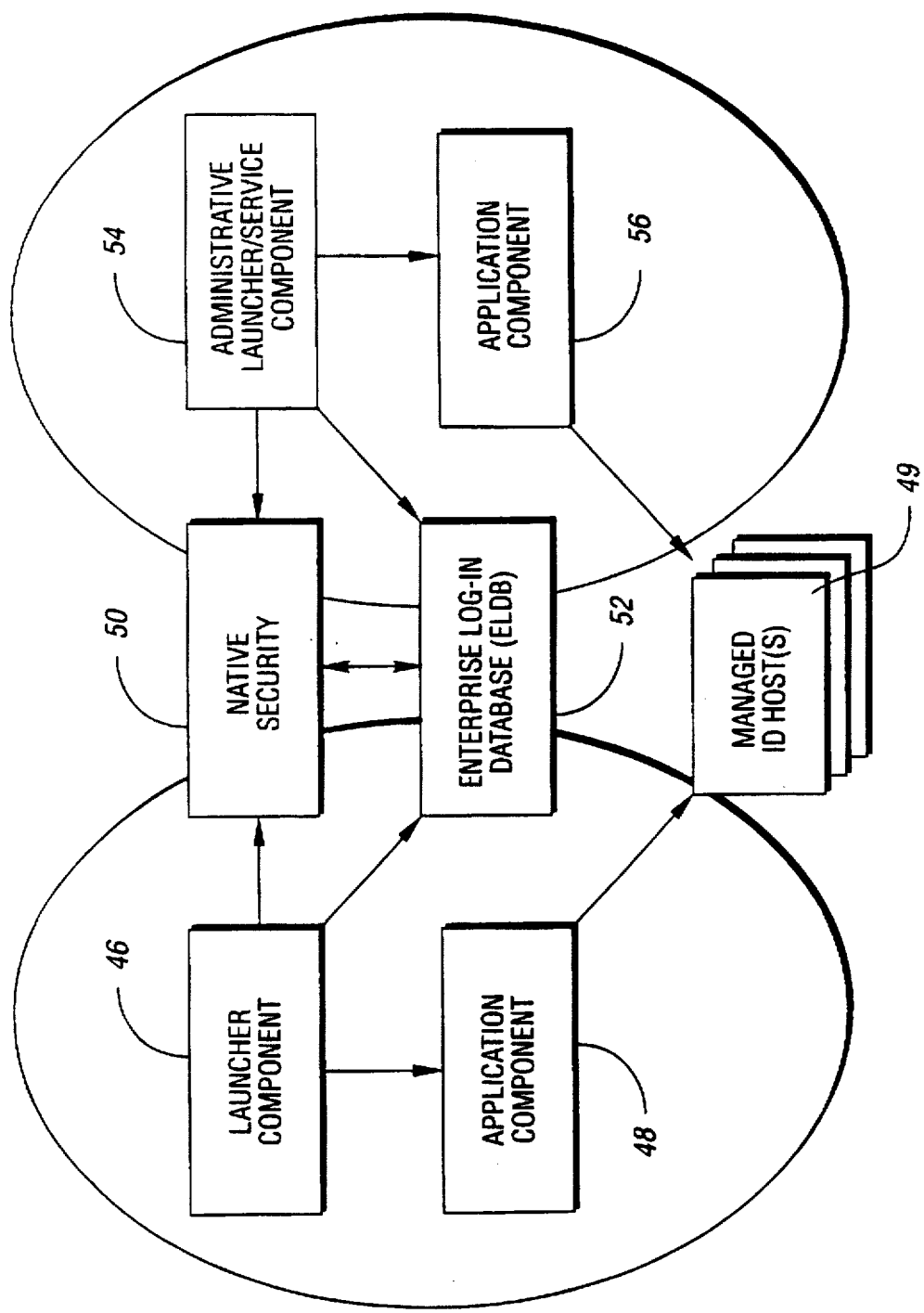
FIG. 4 is a schematic diagram illustrating the processing paths of the present invention from both the user and the administrative perspectives.

The invention may be further understood by reference to FIG. 4 of the drawings which illustrates the processing paths from both the user and the administrative perspectives. FIG. 4 assumes that the user has authenticated herself to the native security system and has since been presented with a launcher application 46. In operation, the user requests a particular application component 48 from the launcher 46. Launcher 46 thereafter makes a call to native security system 50 to determine if the user is permitted access to a particular application component. This determination is made by comparing the user's assigned profile with the access control list of the particular application. More specifically, the user's identity and/or assigned roles are compared with the authorized identities and/or authorized roles for the particular application. If the user's identity or at least one assigned role finds a match in the access control list, the user's request is considered valid. Accordingly, the user is either returned an affirmative response along with the account type to request from the ELDB 52 or a negative response.

In keeping with the invention, an account is understood as an instance of access rights and resource privileges granted to an individual or entity for a specific system or application. An account type merely refers to a specific class of account which defines the access privileges and roles granted to the user. Account types may be identified by data fields, in addition to the user name and password, passed to the application at log-in time. The account type may also identify the types of services, such as update capabilities, available to the user.

Referring still to FIG. 4 of the drawings, if a negative response is received from the ELDB 52, then the requesting user's identity and/or roles are not currently valid for the request and processing stops. The user will be notified of the failure and the inappropriate request will be logged to a native security log (not shown). It should be understood that along with this exchange, the launcher component 46 itself, is validated as a user by the native security system 50 so as to prevent unauthorized access to ELDB 52.

The appropriate account type, based on the user's role, will be sent to the launcher component 46 to request an account from the pool of accounts stored in the ELDB 52. Again, pooled accounts, as part of the present invention, are a set of accounts authenticated for access to a host system or application with comparable privileges on the host that are managed by the ELDB 52. Each member of the set provides a virtual identity to the user when the account is allocated by the ELDB to the application. Thus, a specific account is only related to a specific human or service user at run time after the mapping has taken place.

If the request can be satisfied, then the account data is passed to the launcher component 46, preferably, but not necessarily, in encrypted form. An auditing record is thereafter written to an audit log (not shown) of ELDB 52. Conversely, if an appropriate account is not available from the pool, the user will be notified of the failure and an alarm signal will be sent to the monitoring platform to notify the operations staff of the failure. Thereafter, launcher component 46 spawns the application component required to access the non-natively secured application or service requested by the user. Account data is then passed along to the application component 48.

Finally, the application component 48 decrypts the account data, if necessary, and negotiates a session with the host application 49 on behalf of the user. Since the application log-in sequence is completed as a part of the session negotiation process, the user will now be free to work with the application.

The location for decrypting the data discussed above may, of course, be varied according to the capabilities of specific application components. For example, the data may be decrypted by the launcher 46 and passed directly to the application component 48. This type of flexibility allows for integration with a wider variety of application components.

When the user closes the application component or logs off the platform, the pooled account is returned to the ELDB 52 and an appropriate auditing record is written. It should be noted that this action of logging off the host and releasing the pooled account may also be automated and initiated without user intervention for long dormant sessions.

The administrative path, whether an interactive tool or an agent, is much like the user path. The processing path assumes that either the interactive user or the platform service acting as a launcher has been authenticated to the native security system 50.

In operation, the launching mechanism 54 which may be a timed process for running the agents or an interactive launcher for the operations staff, is authenticated to the native security system to ensure appropriate access to ELDB 52.

Thereafter, the account or accounts required to perform the desired actions are requested from the ELDB 52 and, if available, are returned to launcher 54 preferably, but not necessarily, in an encrypted form. An appropriate auditing record is thereafter written. If the account(s) are not available then the user or service is notified and an appropriate alarm signal is sent to the monitoring platform. Thereafter, the launcher spawns the application component 56 passing the account data which negotiates the host session and allows the user to complete its tasks.

Similar to the user view processing path, the locations for decrypting the data may be varied according to the capabilities of specific tool components. For example, the data may be decrypted by the launcher 54 and passed directly to the application 56. Again, this type of flexibility allows for integration with a wider variety of administrative tools.

Figure 5:
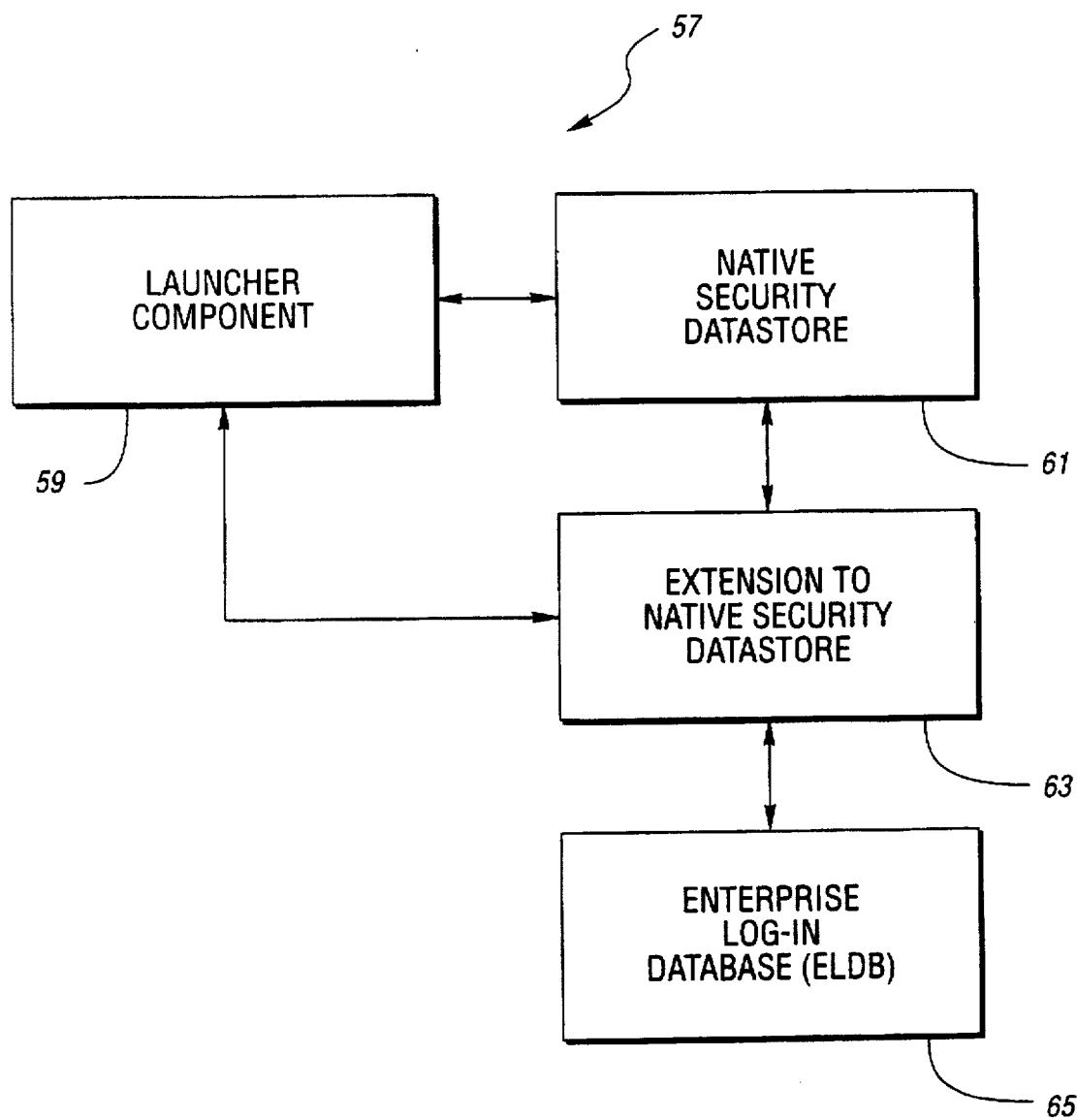
FIG. 5 is a generalized flow diagram illustrating the data relationships between and among the system components of the present invention.

Turning now to FIG. 5 of the drawings, a generalized flow diagram 57 illustrates the data relationships between and among the system components described above. As shown, launcher component 59 communicates with the native security datastore 61 and/or the extension to native security datastore 63 so as to provide user authentication and to map user requests to the need for access to non-natively secured applications. As indicated above, the native security datastore comprises the native user's profile which includes the user's identity and may further include a set of user roles. Native security datastore 61 communicates with the extension to native security datastore 63 in order to map user identities (and possibly roles) to account types. These datastores are further provided in communication with an Enterprise Log-In Database (ELDB) 65. As indicated above, this database includes a set of pooled accounts (virtual identities for non-natively secured applications) and assists in the auditing function to audit data and provide end-to-end accountability for all pooled account usage. Database 65 communicates with native security datastore 61 and/or extension to native security datastore 63 in order to map account types to virtual identities (pooled accounts) for a non-natively secured application to obtain an appropriate account.

Figure 6:
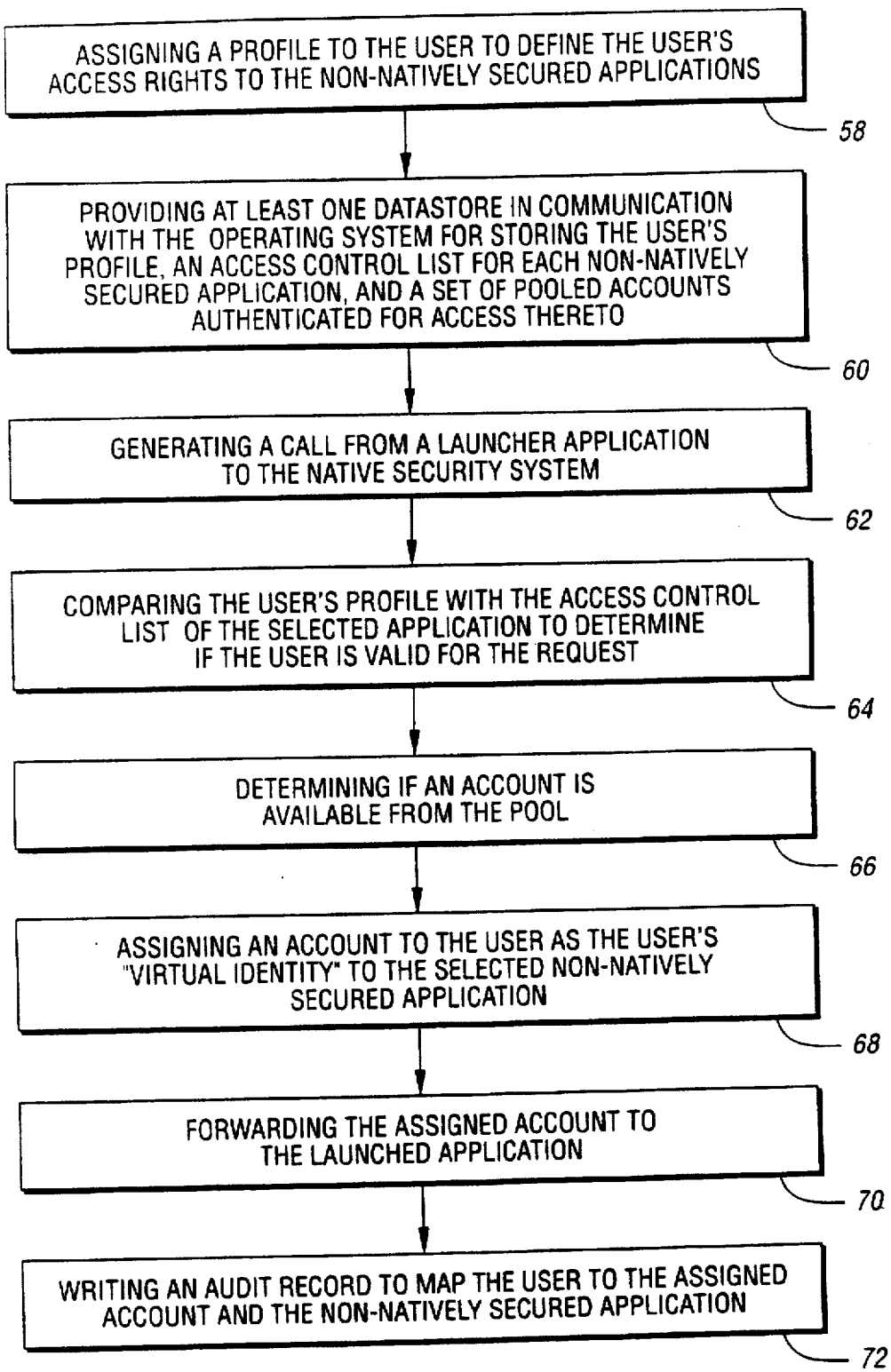
FIG. 6 is a block diagram of the method steps of the present invention.

The generalized processing steps from the user perspective, may be further understood by reference to the simplified block diagram of FIG. 6. As indicated above, the method of the present invention is specifically intended for user in cooperation with an operating system having a native security system such as, for example, Windows® NT 4.0. However, any suitable operating system having the required functionality may be used.

As shown in FIG. 6, the method includes assigning 58 a profile to the user to define the user's access rights to the non-natively secured applications. The profile includes the user's identity and may also include a set of assigned roles. At least one database is also provided 60 in communication with the operating system for storing the user's profile as well as account data relating to each of the non-natively secured applications, including an access control list defining authorized users and a set of pooled accounts authenticated for access to the respective non-natively secured application. The access control list may include a set of authorized user identities and/or authorized roles for each non-natively secured application.

In response to a request by the user to access a selected remote application, a call is generated 62 from a launcher application to the native security system. Thereafter, the user's profile is compared 64 with the access control list for the selected application. More specifically, the user's identity and/or assigned roles are compared with the authorized identities or roles to determine if the user's identity or at least one assigned role finds a match.

If it is determined that the user is permitted access to the selected non-natively secured application, it is next determined 66 if an account is available from the pool. If an account is available, it is assigned 68 to the user as the user's virtual identity to the selected non-natively secured application. Thereafter, account data is forwarded 70 to the launcher application and an audit record is written 72 so as to map the specific user to the assigned account and thus to the requested non-natively secured application.

Figure 7:
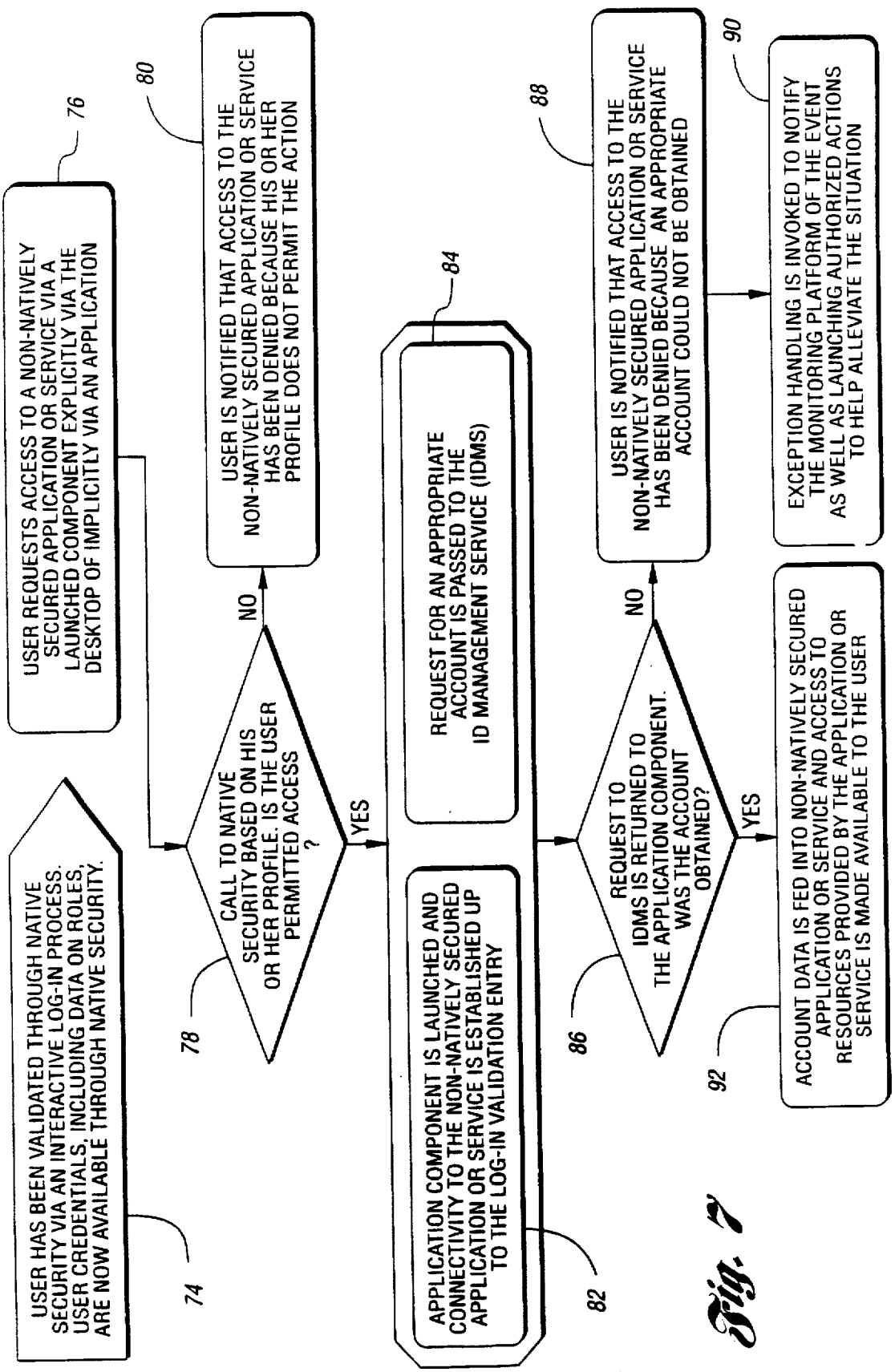
FIG. 7 is a flow diagram of the method steps of the present invention.

The detailed flow diagram of FIG. 7 provides even further understanding of the above-described method. As shown at 74, a user is initially validated through native security via an interactive log-in process. At this point, user credentials, including data on roles (if a role-based system is used), are available through the native security system. Thereafter, at block 76, the user requests access to a non-natively secured application or service via a launcher component (explicitly via the desktop or implicitly within application). At 78, a call is then placed to the native security system.

Based on the user's profile, including user identity and/or assigned roles, a determination is made whether or not the user is permitted access to the selected non-natively secured application. If access is denied such as indicated at block 80, the user is notified that access to the non-natively secured application or service has been rejected because his/her profile does not permit access. If access is permitted, the application component is launched and connectivity to the non-natively secured application or service is established up to the log-in/validation entry zone at 82. At substantially the same time, a request for an appropriate account is passed to the ELDB as indicated at 84.

Thereafter, as shown at 86, a request to the ELDB is returned to the application component and it is determined if an account was obtained. If an account was not obtained, the user is notified at 88 that access to the non-natively secured application or service has been denied because an appropriate account could not be obtained. Exception handling is invoked at 90 to notify the monitoring platform of the event as well as invoking automated actions to help alleviate the situation. If an account was obtained, account data is fed into the non-natively secured application or service at 92 and access to resources provided by the application or service is made available to the user.

In summary, the method and system disclosed herein allows for the user to be authenticated to remote non-natively secured applications using a virtual identity rather than a user identity which results in a conceptual and operational separation between the concepts of user authentication and system auditing. The invention further allows for the native security services of an operating system to be leveraged, without significant change or impact, so as to provide user authentication.

As part of the invention, all required functionalities are provided for the diverse set of hosts without requiring any change, or even cognizance of the scheme, on the part of the host systems. The invention also treats the host applications as a generic set of services and so its application is not limited to a particular subset of hosts or means of access. The log-in and password management approach is as effective for graphical user interface applications as it is for native host sessions.

While the best modes for carrying out the invention has been described in detail, those familiar with the art to which this invention relates will recognize various alternative designs and embodiments for practicing the invention as defined by the following claims.

What is claimed is:

1. For use in cooperation with an operating system having a native security system, a method for authenticating and auditing access by a user to non-natively secured applications, comprising:

assigning a profile to the user to define the access rights to the non-natively secured applications;

providing at least one datastore in communication with the operating system for storing the user's profile and account data relating to each of the non-natively secured applications, including an access control list defining authorized users and a set of pooled accounts authenticated for access to the respective non-natively secured application;

generating a call from a launcher application to the native security system or an extension thereof in response to a request by the user to access a selected non-natively secured application;

determining if the user is permitted access to the selected non-natively secured application;

requesting an account from the set of pooled accounts in response to a determination that the user is permitted access to the selected non-natively secured application;

determining if an account is available from the set of pooled accounts;

assigning an account to the user in response to a determination that an account is available from the set of pooled accounts, the assigned account operative as the user's virtual identity to the selected non-natively secured application;

forwarding account data to the launcher application; and generating an audit record to map the user to the assigned account.

2. A method as in claim 1, wherein the step of determining if the user is permitted access to the selected non-natively secured application comprises comparing the user's access rights with the access control list for the selected non-natively secured application.

3. A method as in claim 2, wherein the user profile includes a set of assigned roles and the access control list for each of the non-natively secured applications includes authorized user roles.

4. A method as in claim 3, wherein the step of determining if the user is permitted access to the selected non-natively secured application includes comparing the user's assigned roles with the authorized roles for the selected non-natively secured application to determine if at least one assigned role is valid for the request.

5. A method as in claim 4, further comprising decrypting the received account data negotiating a session on behalf of the user at the selected non-natively secured application.

6. A method as in claim 2, wherein the user profile includes the user's identity and the account data includes a set of authorized identities.

7. A method as in claim 6, wherein the step of determining if the user is permitted access to the selected non-natively secured application includes comparing the user's identity with the authorized identities for the selected non-natively secured application to determine if the user is valid for the request.

8. A method as in claim 1, further comprising:

identifying to the operating system an account type to request from the datastore in response to the determination that the user is permitted access to the selected non-natively secured application; and sending the identified account type to the native security system or an extension thereof.

9. A method as in claim 1, wherein the operating system is Microsoft Windows® NT 4.0.

10. A method as in claim 1, wherein the account data forwarded to the launcher application in response to a determination that an account is available is sent in encrypted format.

11. A method as in claim 1, further comprising discontinuing processing, notifying the user of a failure, and writing an inappropriate request record to a security log in response to a determination that a user is not permitted access to the selected non-natively secured application.

12. A method as in claim 1, further comprising notifying the user of a failure and sending an alarm signal to an administrative monitoring platform in response to a determination that an account is not available from the pool.

13. For use in cooperation with an operating system having a native security system, a system for authenticating and auditing access by a user to non-natively secured applications, comprising:

at least one datastore in communication with the operating system for storing:

(a) a profile assigned to the user to define the user's access rights to the non-natively secured applications, (b) account data relating to each of the non-natively secured applications, including an access control list defining authorized users, and (c) a set of pooled accounts authenticated for access to the respective non-natively secured application;

whereby the native security system is operative to:

(a) request an account from the set of pooled accounts in response to a determination that the user is permitted access to a selected non-natively secured application;

(b) determine if an account is available from the set of pooled accounts;

(c) assign an account to the user in response to a determination that an account is available from the set of pooled accounts, the assigned account operative as the user's virtual identity to the selected non-natively secured application; and (d) generate an audit record to map the user to the assigned account.

14. A system as in claim 13, wherein the native security system or extension thereof determines if the user is permitted access to the selected non-natively secured application by comparing the user's access rights with the access control list for the selected non-natively secured application.

15. A system as in claim 14, wherein the user profile includes a set of assigned roles and the access control list for each of the non-natively secured applications includes authorized user roles.

16. A system as in claim 15, wherein the native security system or extension thereof determines if the user is permitted access to the selected non-natively secured application by comparing the user's assigned roles with the authorized roles for the selected non-natively secured application to determine if at least one assigned role is valid for the request.

17. A system as in claim 14, wherein the user profile includes the user's identity and the account data includes a set of authorized identities.

18. A system as in claim 17, wherein the native security system or extension thereof determines if the user is permitted access to the selected non-natively secured application by comparing the user's identity with the authorized identities for the selected non-natively secured application to determine if the user is valid for the request.

19. A system as in claim 13, wherein the native security system or extension thereof is further operative to discontinue processing, notify the user of a failure, and write inappropriate request record to a security log in response to a determination that a user is not permitted access to the selected non-natively secured application.

20. A system as in claim 13, wherein the native security system or extension thereof is further operative to notify the user of a failure and send an alarm signal to an administrative monitoring platform in response to a determination that an account is not available from the pool.

* * * * *